(12) United States Patent
Devaux et al.

(10) Patent No.: US 9,126,768 B2
(45) Date of Patent: Sep. 8, 2015

(54) CONVEYOR FOR FORMING AT LEAST ONE BATCH OF PRODUCTS

(71) Applicant: SIDEL PARTICIPATIONS, Octeville-sur-Mer (FR)

(72) Inventors: Eric Devaux, Octeville-sur-Mer (FR); Dominique Germain, Octeville-sur-Mer (FR)

(73) Assignee: C.E.R.M.E.X. CONSTRUCTIONS ETUDES ET RECHERCHES DE MATERIELS POUR L'EMBALLAGE D'EXPEDITION, Corcelles-les-Citeaux (FR)

( * ) Notice: Subject to any disclaimer, the term of this patent is extended or adjusted under 35 U.S.C. 154(b) by 0 days.

(21) Appl. No.: 14/244,577

(22) Filed: Apr. 3, 2014

(65) Prior Publication Data
US 2014/0299446 A1    Oct. 9, 2014

(30) Foreign Application Priority Data
Apr. 9, 2013    (FR) ..................... 13 53171

(51) Int. Cl.
*B65G 47/08*    (2006.01)
*B65G 17/32*    (2006.01)
(Continued)

(52) U.S. Cl.
CPC .............. *B65G 47/084* (2013.01); *B65G 17/12* (2013.01); *B65G 17/323* (2013.01); *B65G 25/02* (2013.01); *B65G 47/082* (2013.01); *B65G 2201/0261* (2013.01); *B65G 2811/0615* (2013.01)

(58) Field of Classification Search
CPC .... B65G 25/02; B65G 47/082; B65G 47/084; B65G 47/086; B65G 47/088; B65G 2201/0261; B65G 2811/0615; B65G 17/12; B65G 17/323
USPC ....................... 198/419.3, 419.2, 418.7, 459.1
See application file for complete search history.

(56) References Cited

U.S. PATENT DOCUMENTS 4,154,331 A  *   5/1979   Graham ......................... 198/434
4,552,261 A  *  11/1985   Raudat et al. ............... 198/419.3
(Continued)

FOREIGN PATENT DOCUMENTS

EP    2500296 A1    9/2012
FR    2974573 A1    11/2012
(Continued)

OTHER PUBLICATIONS

Search Report dated Nov. 22, 2013, issued by the French Patent Office in corresponding Application No. 1353171.

*Primary Examiner* — Leslie A Nicholson, III
*Assistant Examiner* — Keith R Campbell
(74) *Attorney, Agent, or Firm* — Sughrue Mion, PLLC (57) ABSTRACT

A conveyor which allows the formation and movement of at least one batch of products from a line of products in single file, in at least one passage at an upstream station. The conveyor includes, at an upstream station, a rug for moving said products, and a movement device for moving a predetermined quantity of products from said line of products, between the upstream station and a downstream station. The movement device has engaging elements able to be placed in contact with the products. The rug has a through hole. The movement device is arranged under said at least one passage. The engaging elements are mounted to be movable, relative to said movement device, between a retracted position and an engaged position.

17 Claims, 9 Drawing Sheets

(51) Int. Cl.
*B65G 17/12* (2006.01)
*B65G 25/02* (2006.01)

(56) References Cited

U.S. PATENT DOCUMENTS 4,637,509 A    1/1987  Raudat et al.
5,667,055 A *  9/1997  Gambetti ................... 198/419.3
6,755,606 B2 * 6/2004  Luebben et al. ........... 414/798.7
6,763,929 B2 * 7/2004  Malini ....................... 198/419.3
2013/0199897 A1  8/2013  Vasse et al.

FOREIGN PATENT DOCUMENTS

| | | |
|---|---|---|
| JP | S55164228 U | 11/1980 |
| NL | 1001476 C1 | 4/1997 |
| WO | 2012/056145 A1 | 5/2012 |

* cited by examiner

CONVEYOR FOR FORMING AT LEAST ONE BATCH OF PRODUCTS

FIELD OF THE INVENTION

The invention relates to a conveyor which allows the formation of one or more batches of products from a line of products.

BACKGROUND

In conveyors, it is customary to align one or more lines of products in single file when bringing them to a packaging station.

The products may be touching each other or may be spaced apart by a predetermined distance.

It is also customary for the products to be guided by passages delimited by walls along the sides, and for their bases to rest at least partially on a movable bed. The movable bed may be implemented for example as one or more conveyor beds or as a moving belt.

There are various known methods for creating batches of products out of a line of products accumulated in single file. For example, a movable stop can be provided on the conveyor, such as a stop bar, which allows a predetermined number of products to pass by at regular intervals. A lateral pusher could also be provided on the conveyor, which laterally shifts a row of products containing a predetermined amount of products, the amount depending on the length of said pusher.

Once the row of products is isolated (via the stop bar or pusher system), a gripper head can capture the batch of products, which is possibly then packaged in a box. Some gripper heads even allow creating multiple batches of products from a predetermined amount of captured products. Such a gripper head is, for example, described in document FR 2,974,573.

The disadvantage of the pusher is that it does not allow isolating several batches of products at the same time when the products are arriving on multiple mutually parallel corridors.

When properly placed, stop bars can be used to create multiple batches of products arriving in mutually parallel corridors. However, this solution is not adaptable, as it only allows stopping the flow of lined-up products at regular intervals in order to remove a predetermined amount to form a batch of products.

SUMMARY OF THE INVENTION

The invention aims to provide an alternative technical solution that allows not only forming batches of products from a line of products, but also allows moving them and possibly changing the spacing between the products. In addition, the technical solution of the invention can be implemented on a conveyor having one or more passages in which the products arrive in single file.

The invention also allows creating batches of products from lines of products conveyed in holders commonly called "pucks".

For this purpose, the invention relates to a method of conveyance which allows the formation and movement of at least one batch of products from a line of products aligned in single file in at least one passage, at an upstream station, said method allowing the movement of said batch of products between said upstream station and a downstream station. In a manner known in and of itself, the method makes use of:

at the upstream station, a belt for moving said products,
and between the upstream station and the downstream station, a movement device for moving a predetermined amount of products from said line of products,
the movement device comprising engaging elements able to be placed in contact with said products.

According to the invention, the method is characterized by the displacement device being initially arranged underneath said at least one passage, by said belt having a through opening, and by said movement device carrying out the following steps:

placing each of the engaging elements of the movement device in contact with the base of the products among said predetermined amount of products, at said upstream station, this contact being achieved by moving the engaging elements between a retracted position and an engaged position,
moving said engaging elements to said downstream station,
disengaging the engaging elements from the products, by moving the engaging elements between the engaging position and the retracted position, at said downstream station, and
returning said movement device to underneath said upstream station.

When implemented in this manner, the method of the invention captures products from below, thereby freeing the space above the conveyor and making the facility more compact. Furthermore, the method allows defining product groups, meaning it allows creating groups of products from a line of products aligned in single file.

The method of the invention may also comprise the following characteristics, individually or in combination:

between the contact step and the moving step, the method may include a step of locking each of the engaging elements in position on the base of the products;
the engaging elements may comprise teeth for capturing the products, and the locking step may include a movement of the capturing teeth;
the disengaging step may be achieved by unlocking the engaging elements and then moving the engaging elements from the engaged position to the retracted position;
the engaging elements may be moved apart from each other during the moving step, and the engaging elements may be moved back together during the return step.

The invention also relates to a conveyor allowing the formation and movement of at least one batch of products from a line of products aligned in single file, in at least one passage at an upstream station, said conveyor comprising:

at an upstream station, a belt for moving said products,
and a movement device for moving a predetermined amount of products among said line of products, between said upstream station and a downstream station, the movement device having engaging elements able to be placed in contact with said products.

The conveyor according to the invention is characterized by said belt comprising a through opening, by said movement device being arranged underneath said at least one passage, and by said engaging elements being mounted to be movable relative to said movement device between a retracted position and an engaged position.

According to the invention, the conveyor may also have the following characteristics, individually or in combination:

said movement device may comprise:
at least one first comb, comprising fixed teeth at least partially constituting said engaging elements, said fixed teeth being distanced from each other by a predetermined distance corresponding to the desired distance between the products at said downstream station, said fixed teeth being oriented towards the base of the products, and at least one second comb, comprising second teeth that are movable relative to said fixed teeth, said second comb being movably mounted relative to said first comb;

said movement device may comprise at least one actuating cylinder ensuring the mobility of the second comb relative to said first comb, and said at least one actuating cylinder may include a rod carried by said first comb and a body carried by said second comb;

the first and second combs may be mounted to be movable in vertical translation on a carriage, the carriage being mounted to be movable between the upstream station and the downstream station;

said products may be the holders known as "pucks" to a person skilled in the art, each puck being suitable for receiving a product of a second type, and the pucks having seats for receiving the engaging elements;

the seats may each have an elongated shape to allow movement of the engaging elements;

the pucks may comprise peripheral grooves near their base;

the engaging elements may be rotatably mounted on said movement device, to allow orienting said products.

Lastly, the invention relates to an installation comprising at least two conveyors as defined above.

According to the invention, the conveyors of such an installation may comprise carriages that have paths of different lengths between the upstream station and the downstream station, such that the groups of products arrive at the downstream station in a staggered manner.

BRIEF DESCRIPTION OF THE DRAWINGS

The invention is disclosed in a sufficiently clear and complete manner in the following description to enable its execution, accompanied by drawings in which.

DESCRIPTION OF THE EMBODIMENTS

In the following description, the terms "lower", "upper", "top", "bottom", etc. are used in reference to the drawings to clarify the explanation. They are not to be understood as limiting the scope of the invention.

An example of the conveyor according to the invention will first be described, with reference to FIGS. 1 to 10. The method will then be described, with reference to FIGS. 11A to 11G.

Figure 1:
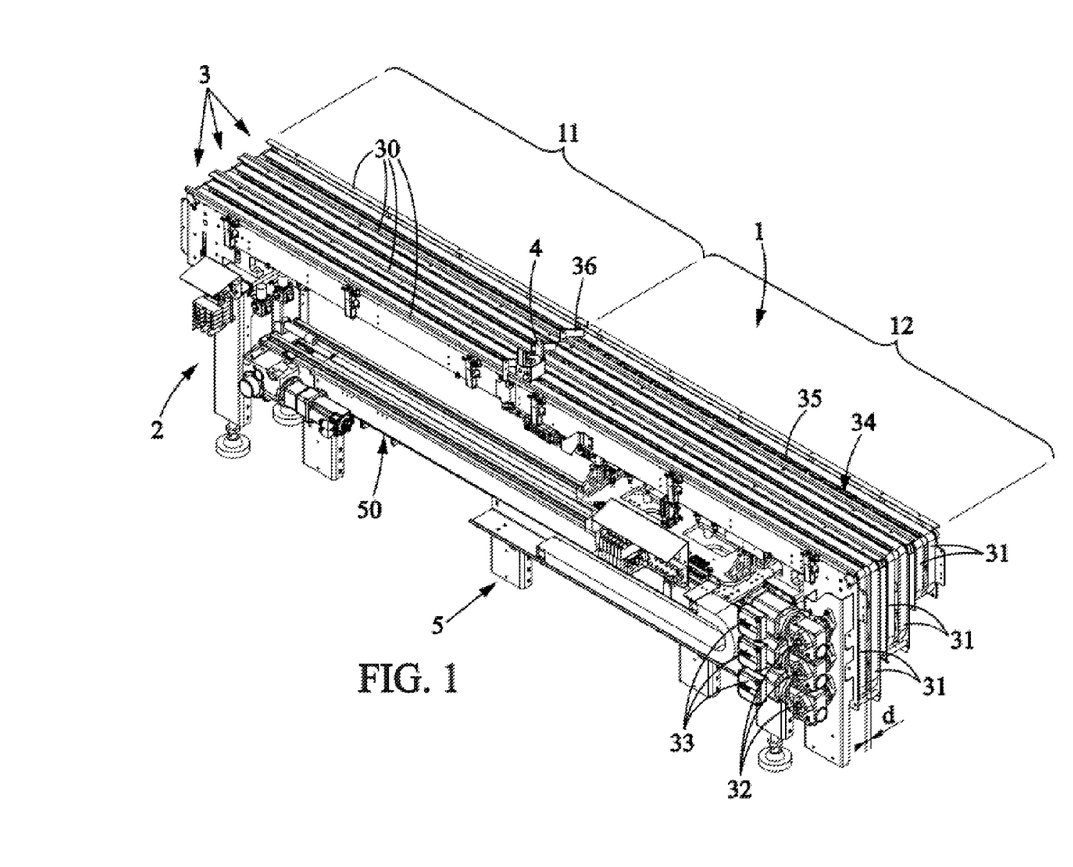
FIG. 1 shows a portion of an installation according to the invention from a top perspective view, the installation being equipped with a conveyor according to the invention.

FIG. 1 shows a conveyor 1 according to the invention, comprising a frame 2 on which are mounted three passages 3 for receiving products 4 in single file. Not all the products have been represented, to simplify the figure. Only one product 4 is therefore visible, in the leftmost passage of the conveyor 1.

The product 4 is represented as a holder commonly called a "puck" by persons skilled in the art. A puck is a container that can carry a different type of product (for example a cosmetic product or food product) that cannot remain upright on the conveyor. Examples are shampoo bottles of a particular shape or the flexible bags such as "doypacks".

It should be understood that the invention is not limited to the presence of pucks and applies to the movement of all kinds of products, including products that are not conveyed in pucks.

Each passage 3 is defined by two side walls 30, and it is possible for the same side wall 30 to separate two adjacent passages 3.

The passages 3 also each comprise two endless belts 31, parallel to each other and separated by a distance d.

The two endless belts 31 of a same passage are driven by the rotation of a shaft 32 connected to a motor 33, located downstream of the passages 3 and therefore of the conveyor 1, in the example represented in the figures.

As can be seen in FIG. 1, each pair of belts 31 of each passage 3 has its own drive motor.

The operation of the three motors 33 is synchronized.

The pairs of endless belts 31 form conveyor belts 34 for each of the passages 3, which move the products 4 resting at least partially on each endless belt 31.

Two opposite edges 40 of the bases 41 of the products 4 (see FIG. 10) each rest on an endless belt 31.

There is thus a space 35 between the two belts 31, which defines a through opening between the belts 31 that provides access to the bases 41 of the products 4.

The passages 3 are also each equipped with a stop 36 that is movable between two positions, one which stops the products 4 advanced by the conveyor 34, and the other which allows the products 4 to advance.

FIG. 1 shows the stops 36 in the position that does not allow the products 4 to advance.

The portion of the conveyor that is upstream of the stops 36 is considered an upstream station 11. The portion of the conveyor 12 that is downstream of the stops 36 is considered a downstream station.

According to the invention, the conveyor is provided with a movement device 5 for moving a predetermined amount of products 4 aligned in single file, in three rows in the passages 3.

The device 5 is positioned under the passages 3, as can be seen in FIG. 1.

Figure 2:
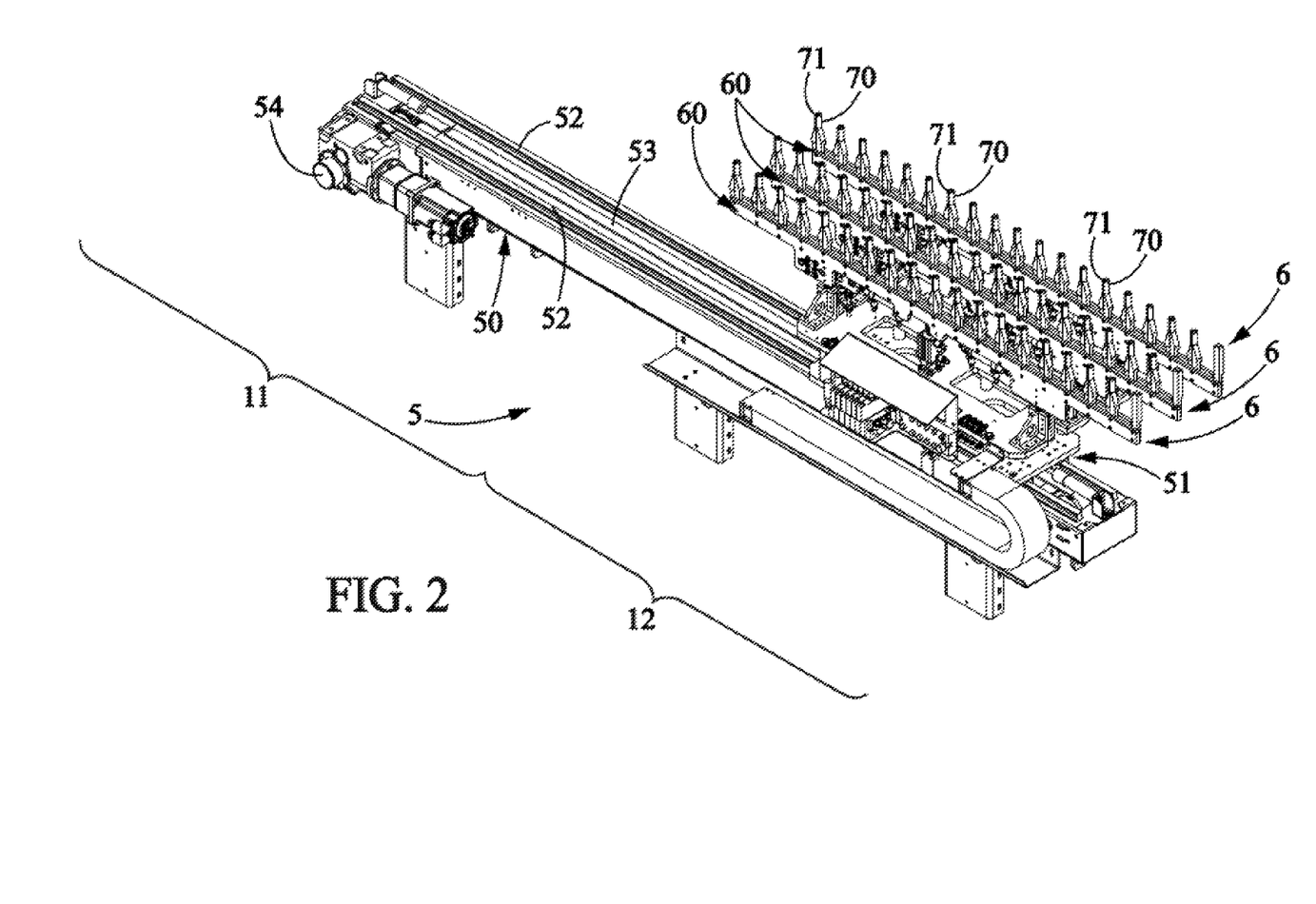
FIG. 2 shows a movement device of a conveyor according to the invention, in a side perspective view.
Figure 3:
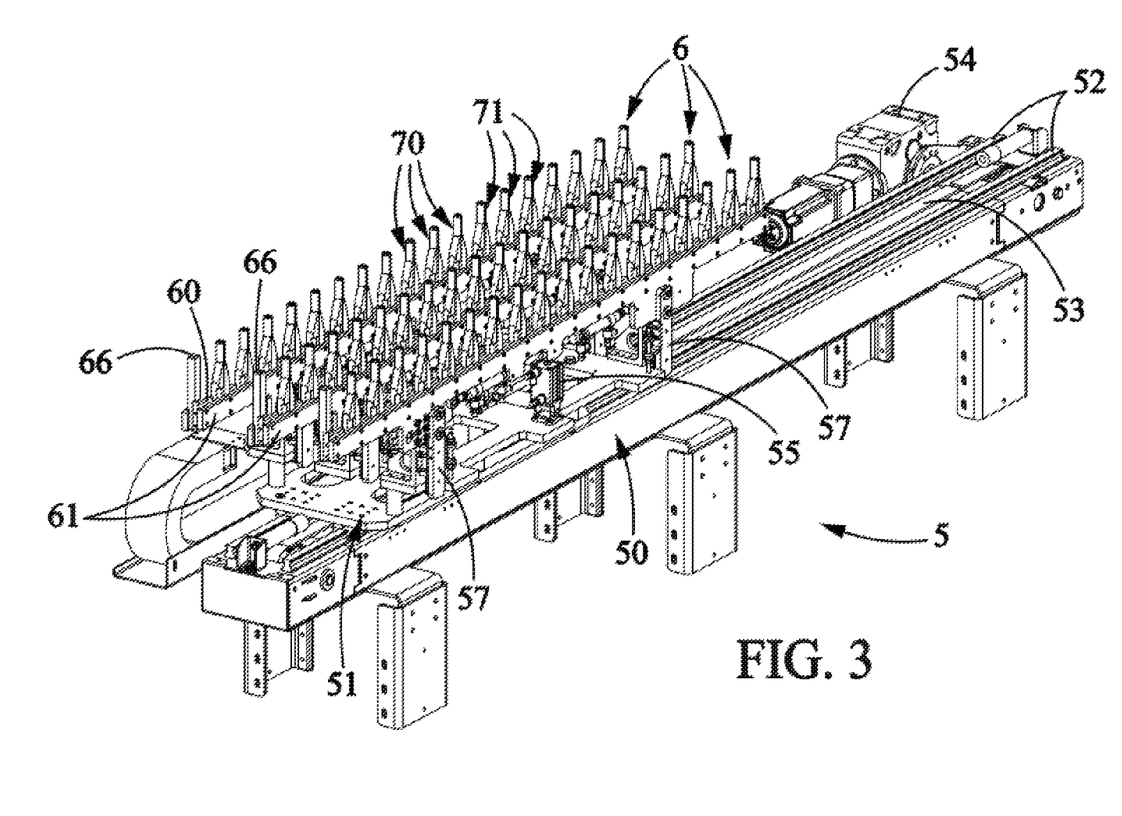
FIG. 3 shows the device of FIG. 2, in a perspective view from the other side.

FIGS. 2 and 3 show only the movement device 5, which will now be described.

The movement device 5 has its own frame 50 on which is mounted a movable carriage 51.

To allow its movement, the carriage 51 is mounted on two rails 52 that are integral to the frame 50. The carriage 51 is also connected to a toothed belt 53 driven by a motor 54.

The endless belt extends for the entire length of the conveyor 1, so that the advancement of the toothed belt 53 moves the carriage between the upstream station 11 and the downstream station 12 of the conveyor.

As can be seen in FIGS. 2 and 3, the carriage 51 supports three groups 6 of combs.

The three groups 6 of combs are mutually parallel.

Each group 6 of combs comprises two combs 60 and 61: a first comb 60 has teeth 70 which are oriented upwards and which are fixed relative to the carriage 51. A second comb 61 has teeth 71 which are also oriented upwards and which are mounted to move relative to the carriage 51.

More specifically, comb 61 is mounted to move relative to comb 60, by comb 61 sliding relative to comb 60 along a longitudinal axis, said axis substantially corresponding to the axis of a bar 62 (see FIG. 4) of comb 61, said bar 62 connecting all the teeth 71 of comb 61.

Figure 5:
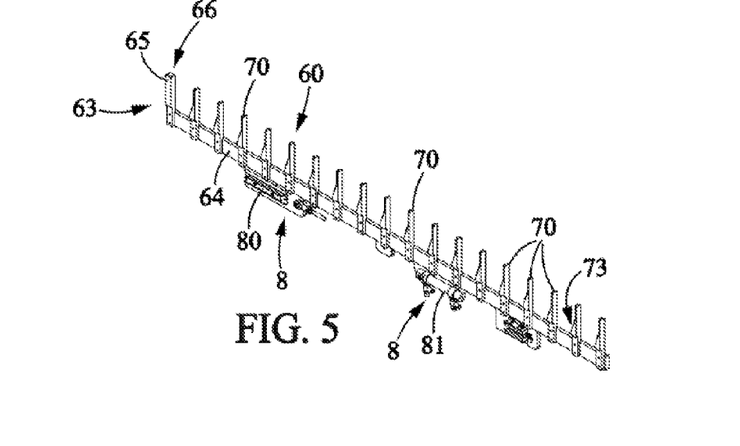
FIG. 5 shows one of the elements of the portion of the movement device shown in FIG. 4.

FIG. 5 shows only the comb 60 which is fixed. Note that at one end 63 of the bar 64 connecting all the teeth 70, there is an element 65 forming a stop 66. The stop 66 protects the combs from collisions with products being released downstream.

Figure 4:
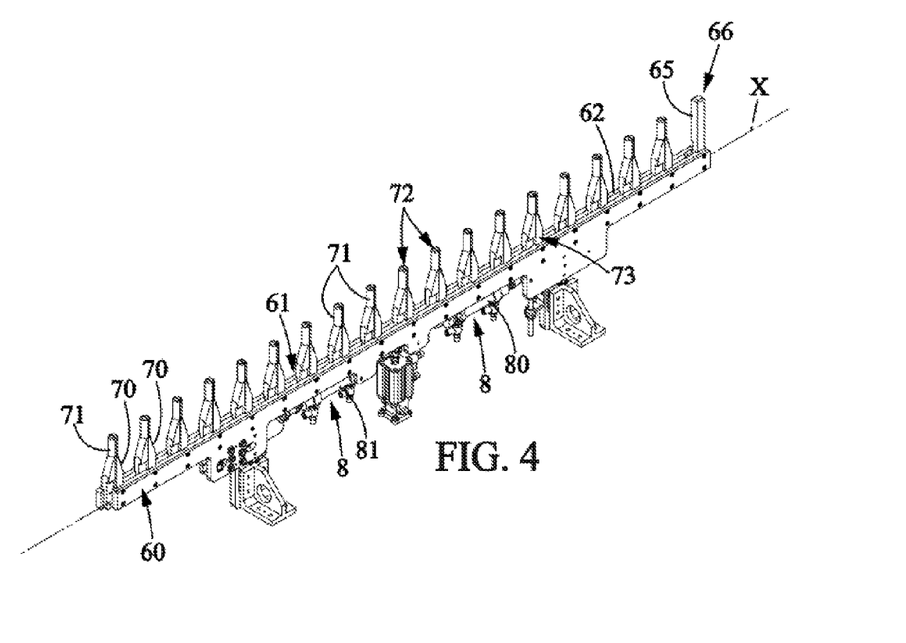
FIG. 4 shows a portion of the movement device illustrated in FIGS. 2 and 3.
Figure 6:
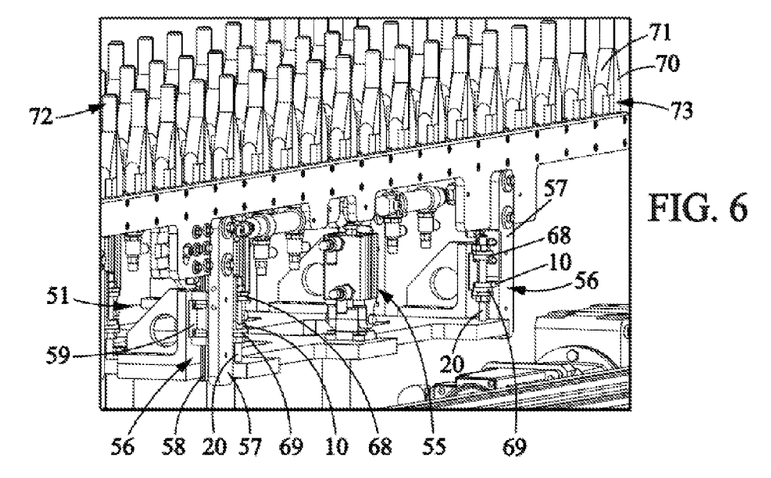
FIG. 6 is another partial perspective view of the movement device of the conveyor according to the invention.
Figure 7:
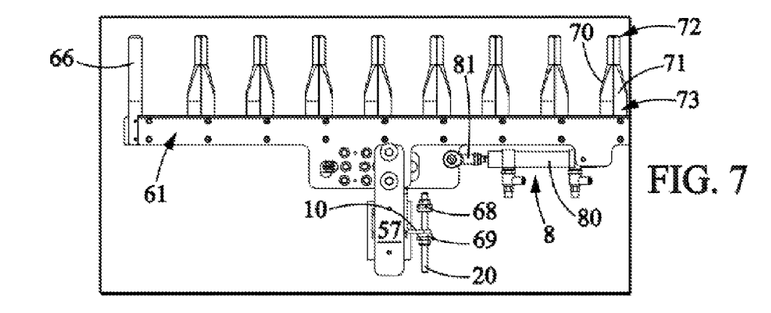
FIG. 7 is a side view of the portion of the device shown in FIG. 4, in a first position.
Figure 8:
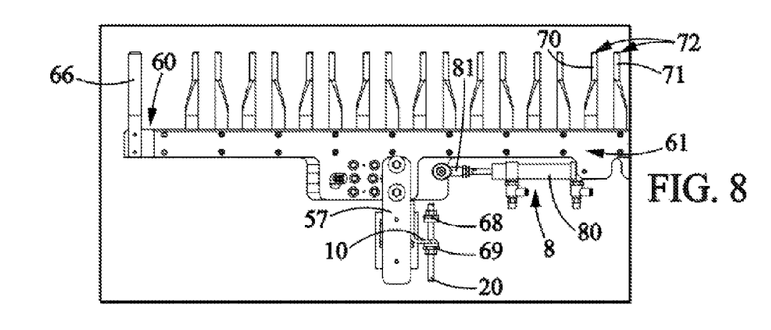
FIG. 8 is another side view of that portion of the device.

One will also note that the teeth 71 of comb 61 and the teeth 70 of comb 60 have substantially symmetrical shapes, so that when the teeth 71 and 70 are against each other, together their free ends 72 form a finger that is cylindrical in shape (see FIGS. 4 and 6).

Each tooth 71 or 70 therefore has the shape of a half-cylinder at its free end 72.

The other end of the teeth 73 (the one connected to the bar 62 or 64) has the shape of a half-pyramid, which strengthens the base.

The teeth 70 and 71 form engaging elements which are adapted for placement in contact with the products 4. How this contact is made will be described below.

The teeth 70 and 71, when they are in the joined position, are spaced apart by a predetermined distance.

This distance corresponds to the distance between the two seats 9 (FIG. 10) arranged in two adjacent products 4. These seats will be further described below.

The travel of the movable comb 61 relative to the fixed comb 60 is limited in one direction by the stop 66 mentioned above. In the reverse direction, the travel of the movable comb 61 with respect to the fixed comb 60 is limited by the preset stroke of at least one actuating cylinder 8. In the example illustrated in FIG. 4, two cylinders 8 are provided for connecting the fixed comb 60 and the movable comb 61.

In a known manner, the cylinders 8 comprise a chamber 80 in which a piston is connected to a rod 81.

Each comb 60 or 61 is connected either to a chamber 80 of a piston 8 or to a rod of a piston 8. In other words, one of the pistons 8 has a chamber 80 which is connected to a fixed comb 60, and a rod 81 connected to the movable comb 61. The other piston 8 has a chamber 80 connected to the movable comb 61, and a rod 81 connected to the fixed comb 60. Thus when the rods 81 exit the chambers 80 of the pistons 8, the combs 60 and 61 are moved apart from each other by displacement of the movable comb 61.

The combs 60 and 61 also have means that guide them relative to each other when the movable comb 61 moves: for example, one can see in FIG. 5 that the bar 64 of the fixed comb 60 comprises a rail 67 in which can be movably mounted a longitudinal element supported by the bar 62 of the movable comb 61 (not visible in the figures, but a person skilled in the art will know such guide means).

As can be seen in FIG. 2, the movement device comprises three groups 6 of combs, each group of combs acting within a passage.

In the invention, each group 6 of combs, of which the teeth 70 and 71 constitute the engaging elements, is mounted to move in vertical translation on the carriage 51, between two positions:
 a retracted position in which the combs 60 and 61 (and therefore the teeth 70 and 71) are at a level below the level of the passages 3 that is sufficient to prevent the teeth 70 and 71 from touching the products 4;
 and an engaged position, in which the combs 60 and 61 are at a level such that the teeth 70 and 71 can engage with the seats 9 in the products 4.

In other words, the teeth 70 and 71, which form the engaging elements of the movement device, are movably mounted on the movement device 5.

To achieve this, as can be seen in particular in FIG. 4 or FIG. 6, each group 6 of combs 60 and 61 is associated with a vertical displacement mechanism, such as an actuating cylinder 55.

The cylinder 55 is connected to the group 6 of combs, substantially at the middle of the bars 62 and 64.

To support the groups 6 of combs as they move between the retracted position and the engaged position (or vice versa), two vertical guide elements 56 are provided for each group 6 of combs, on either side of the cylinder 55.

Each guide element 56 comprises an arm 57, integral with a projecting shoe 58 which extends over a portion of its surface (see FIG. 6), and a rail 59 attached to the carriage 51, in which the shoe 58 is movably mounted.

The travel of the groups 6 of combs 60 and 61 is limited by two stops 68 (upper stop) and 69 (lower stop) connected to a vertical shaft 20. For this, a dog 10 integral to the arm 57 is provided, this dog being mounted to move freely along the shaft 20 between the two stops 68 and 69.

The height of the displacement of the groups 6 of combs 60 and 61 can thus easily be adjusted by moving the stops 68 and 69 on the shaft 20.

As can be seen in FIGS. 2 and 3 in particular, each group 6 of combs has a predetermined number of teeth 70 and 71.

The predetermined number of teeth corresponds to the number of products 4 that are to be isolated from the line of products 4 (in the passages 3) to create a batch of products that can be captured downstream by a gripper head.

One can see that with the movement device 5 shown in the figures, which comprises three groups 6 of combs, three batches of eighteen products 4 can be captured and moved.

As indicated above, the products 4 here are pucks designed to accommodate products which are not stable during movement while upright.

Figure 9:
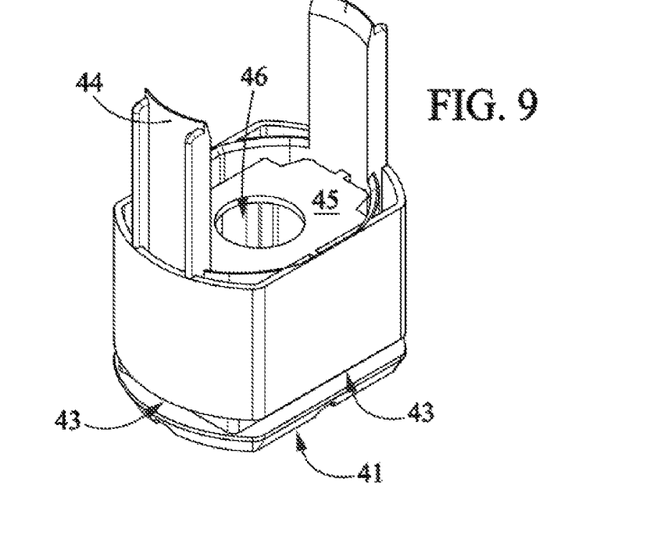
FIG. 9 shows a perspective side view of a puck designed for use in an installation according to the invention.
Figure 10:
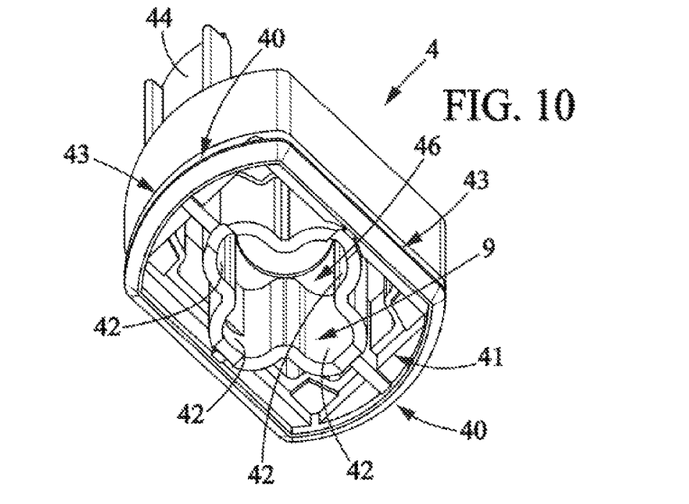
FIG. 10 is a perspective bottom view of the puck illustrated in FIG. 9.

FIGS. 9 and 10 show pucks 4 that are expressly designed to allow capturing them by their base 41.

As indicated above, the pucks 4 have a seat 9 which passes completely through their base (see FIG. 10).

The seats 9 have a t-shaped cross-section. When the teeth 70 and 71 are pressed together and introduced into the seats, they are introduced substantially in the middle of the t. To grasp a puck 4, the teeth 70 and 71 are moved apart until they exert pressure on the inside opposing edges 42 of the t. This is why the shape of the seat 9 must be elongated in at least one direction, to allow this movement of the teeth 70 and 71 (and thus of the engaging elements).

In the case of the t shape, the seat 9 is considered to have an elongated shape in the two directions that form the arms of the t.

The shape of the internal opposing edges of the t-shaped seats 42 corresponds to the shape of the teeth 70 and 71. This maximizes the contact surface area between the teeth 70 and 71 and the internal opposing edges 42.

The seat has a t-shaped cross section to allow a 90° reorientation of the pucks 4 in the passages 3, as it may occur that the products need to be oriented in a certain direction before they are captured and packaged, so that the information provided on the products is directly readable by the consumer when the packaging is opened.

One will also note, in FIG. 10, that the peripheral edge of the puck 4 has a groove 43 contiguous to the base 41. This groove 43 allows the pucks 4 to slide along side rails inside the passages 3, retaining the pucks 4 by their sides as they move along the passages. This not only stabilizes the puck 4 as it is conveyed, it also keeps the puck 4 in position as the product it holds is removed.

To accommodate products of the second type (shown schematically in FIGS. 11A-11G—below), the pucks 4 each have two substantially curved and symmetrical walls 44 between which the products of the second type are inserted.

The pucks 4 may also include an intermediate base 45, meaning a base where the product of the second type rests and which is higher than the base 41 of the puck 4.

One can see in FIG. 9 that the base 45 has a through-hole 46. This hole can serve to seat a cap or head of a bottle positioned upside down (for example a tube of pharmaceutical product), increasing the stability of the product of the second type that is introduced into the puck 4.

The operation of the conveyor will now be described in reference to FIGS. 11A to 11G.

Figure 11:
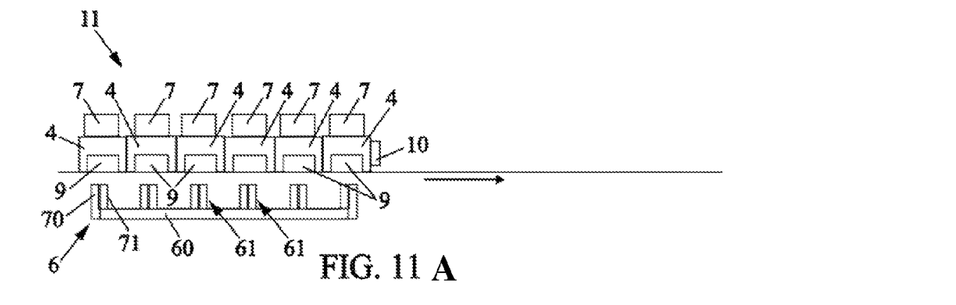
FIGS. 11A to 11G schematically illustrate the steps of the method according to the invention.

The pucks 4 enter the upstream part 11 of the conveyor 1 in single file and in contact with each other. The pucks 4 are stopped in their travel by the stop bar 10.

The pucks 4 carry products of the second type 7 (symbolized by rectangles in FIGS. 11A to 11G).

In the initial position in the cycle of capturing and moving a batch of pucks 4, a group 6 of combs 60 and 61 is positioned under the line of pucks 4 carrying products of the second type 7, with the teeth 70 and 71 in the retracted position (FIG. 11A).

In a second step, the group of combs 60 and 61 is moved from the retracted position to the engaged position (FIG. 11B) by moving the group 6 of combs 60, 61 upward so that the teeth 70 and 71 enter the seats 9 in the pucks. The engaging elements are thus placed in contact with the base of the pucks 4.

In a third step, the position of the teeth 70 and 71 in the seats 9 of the pucks 4 is locked. To do this, the teeth 70 and 71 are moved apart by sliding comb 61 relative to comb 60. This locking step results in some movement in the captured batch of pucks 4. This is why the stop bar 10 is retracted to form a stop upstream in the line of pucks 4, simultaneously with locking the position of the teeth 70 and 71 in the seats 9 (see FIG. 11C).

FIG. 11D illustrates the next step, in which the batch of captured pucks 4 is moved to the downstream station 12. Note that during this movement, the pucks 4 at the upstream station 11 are once again in motion and are approaching the stop bar 10.

FIG. 11E illustrates that once the batch of pucks 4 reaches the downstream station 12, the products 7 they carry are seized by a gripper head in order to be packaged or at least transferred to another station in the installation.

While the products 7 are being removed, the pucks 4 are retained by the engaging elements, meaning the teeth 70 and 71 holding the pucks; the product 7 may therefore be slightly stuck inside the puck 4 without this causing problems during the step of product 7 extraction from the pucks 4.

Once the products 7 have been unloaded from the pucks 4, the teeth 70 and 71 are brought together again by moving comb 61 with respect to comb 60. This frees the engaging elements from their seats 9 in the pucks 4. At the same time, the pucks 4 at the upstream station 11 continue to advance until they come to a stop against the stop bar 10 (see FIG. 11F).

At the downstream station, the group 6 of combs 60, 61 is then moved downwards, disengaging the teeth 70 and 71 from their seats 9 in the pucks 4. This retracts the engaging elements from the engaged position to the retracted position (FIG. 11G). The group 6 of combs 60, 61 is then returned to its initial position in order to capture another batch of pucks 4 at the upstream station.

The above description explains how the conveyor according to the invention allows moving a batch of products by capturing said products from underneath.

"Underneath" has to be understood as being only the surface under the bottom of the product. "Underneath" does not comprise the bottom side corner of the product.

In the examples which have just been described, the products are pucks which have a seat that accepts the engaging element. The pucks are also guided along the sides of the passages.

However, the invention does not only apply to capturing pucks, or only to pucks as described and illustrated in FIGS. 9 and 10.

For example, the invention could be applied to other types of pucks such as those illustrated in FIGS. 12A to 12D.

Such pucks are designed to rotate about their axis. This allows, for example, orienting the products so that they are presented in a certain manner when packed in boxes, as has already been mentioned above.

To enable this rotation or pivoting of the puck about its axis, the engaging elements are allowed to rotate about their axis.

Figure 12:
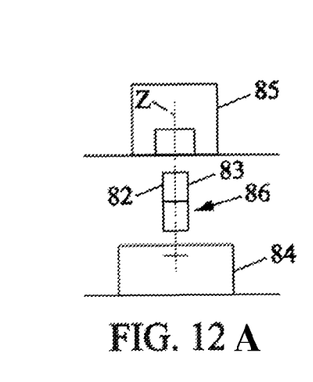
FIGS. 12A to 12D show a variant embodiment of the invention, schematically representing the installation in a side view.

FIG. 12A shows a puck 85 with an engaging element 86 underneath it that comprises two teeth 82 and 83 movable between a locked position (FIG. 12B) and an unlocked position (FIG. 12A or 12D).

The engaging element 86 is mounted to pivot on a base 84 about its axis Z. The base 84 is mounted to move vertically between an engaged position (FIG. 12B and 12C) and a retracted position (FIGS. 12A and 12D).

Initially, before capturing a puck 85, the teeth 82 and 83 of the engaging element 86 are in the unlocked position and the base is in the retracted position (FIG. 12A).

To capture a product, the base 84 is moved vertically to its engaged position and the teeth 82 and 83 are moved to the locked position (FIG. 12B).

In FIG. 12C, one can see that the puck 85 is rotated by an angle of 90 degrees from its position illustrated in FIG. 12B, by rotating the engaging element 86 on the base 84.

FIG. 12D shows the release of the engaging element 86 from the puck 85, by unlocking the teeth 82 and 83 and lowering the base 84 to the retracted position.

The invention can also be applied to the creation of batches of products by grouping products together.

Figure 13:
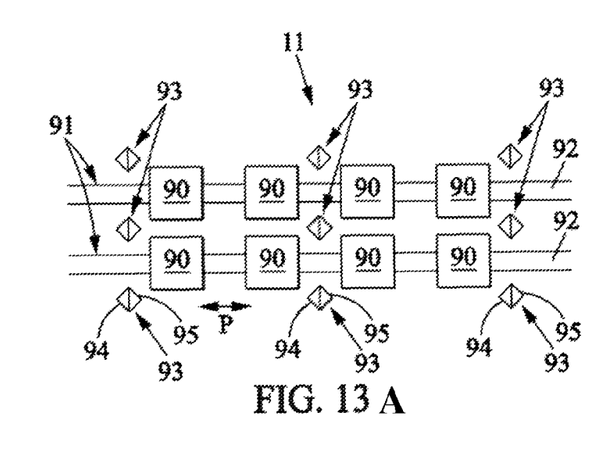
FIGS. 13A and 13B show yet another variant of an installation according to the invention, schematically represented in top views.

In FIG. 13A, one can see products 90 distributed along two paths 91 and spaced apart by a predetermined distance p.

The products 90 are advanced while resting on an endless belt 92, each path having one endless belt 92.

FIG. 13A shows the upstream station 11 of the conveyor and FIG. 13B shows the downstream station 12.

The engaging elements, denoted 93, have two teeth 94 and 95 that are movable relative to each other and are movable between the upstream station 11 and the downstream station 12.

The engaging elements 93 are arranged between two endless belts 92, or in other words between the two paths 91. Other engaging elements 93 are also arranged on either side of the two endless belts 92, so that the two belts 92 are between two rows of elements 93.

Similarly to the method described above for placing the engaging elements 93 in contact with the products 90, the engaging elements are moved vertically and at least some of the teeth 94 and 95 are locked in position against at least two adjacent products 90. In this manner, the engaging elements 93 make it possible to move the products 90 by their contact with these products.

Batches of four products each are created by moving two teeth 94 and 95 relative to each other (arrow f in FIG. 13B), because the movement of the teeth 94 and 95 relative to each other moves certain products closer together, thus forming two batches 96 of four products 90 each.

The invention claimed is:

1. A method of conveyance which allows the formation and movement of at least one batch of products from a line of products aligned in single file in at least one passage, at an upstream station,
    said method allowing the movement of said batch of products between said upstream station and a downstream station,
    said method making use of:
        at the upstream station, a belt for moving said products,
        and between the upstream station and the downstream station, a movement device for moving a predetermined amount of products from said line of products,
    the movement device comprising engaging elements that access respective bases of the products so as to capture the products from underneath,
    the movement device being initially arranged underneath said at least one passage, said belt having a through opening,
    wherein said movement device carries out the following steps:
        placing each of the engaging elements of the movement device in contact with the respective base of the products among said predetermined amount of products, at said upstream station, this contact being achieved by moving the engaging elements between a retracted position and an engaged position that captures the products from underneath,
        moving said engaging elements to said downstream station,
        disengaging the engaging elements from the products, by moving the engaging elements between the engaging position and the retracted position, at said downstream station, and
        returning said movement device to underneath said upstream station.

2. The method according to claim 1, wherein, between the contact step and the moving step, said method includes a step of locking each engaging element in position on the base of the products.

3. The method according to claim 2, wherein the engaging elements comprise teeth for capturing the products, and wherein the locking step comprises movement of the capturing teeth.

4. The method according to claim 1, wherein the disengaging step is achieved by unlocking the engaging elements and then moving the engaging elements from the engaged position to the retracted position.

5. The method according to claim 1, wherein the engaging elements are moved apart from each other during the moving step, and wherein the engaging elements are moved back together during the return step.

6. The method according to claim 1, wherein the engaging elements capture the products from underneath by passing through openings in the respective bases of each product.

7. A conveyor allowing the formation and movement of at least one batch of products from a line of products aligned in single file, in at least one passage at an upstream station, said conveyor comprising:
    at an upstream station, a belt for moving said products,
    and a movement device for moving a predetermined amount of products among said line of products, between said upstream station and a downstream station, the movement device having engaging elements that access respective bases of the products so as to capture the products from underneath,
    said belt comprising a through opening, said movement device being arranged underneath said at least one passage, and said engaging elements being mounted to be movable relative to said movement device between a retracted position and an engaged position in which the products are captured from underneath.

8. The conveyor according to claim 7, wherein said movement device comprises:
    at least one first comb, comprising fixed teeth at least partially constituting said engaging elements, said fixed teeth being distanced from each other by a predetermined distance corresponding to the desired distance between the products at said downstream station, said fixed teeth being oriented towards the base of the products, and
    at least one second comb, comprising second teeth that are movable relative to said fixed teeth, said second comb being movably mounted relative to said first comb.

9. The conveyor according to claim 8, wherein said movement device comprises at least one actuating cylinder ensuring the mobility of the second comb relative to said first comb, and wherein said at least one actuating cylinder comprises a rod carried by said first comb and a body carried by said second comb.

10. The conveyor according to claim 8, wherein the first and second combs are mounted to be movable in vertical translation on a carriage, the carriage being mounted to be movable between the upstream station and the downstream station.

11. The conveyor according to claim 7, wherein the engaging elements are rotatably mounted on said movement device, to allow orienting said products.

12. An installation comprising at least two conveyors according to claim 7.

13. The conveyor according to claim 7, wherein the engaging elements capture the products from underneath by passing through openings in the respective bases of each product.

14. A conveyor allowing the formation and movement of at least one batch of products from a line of products aligned in single file, in at least one passage at an upstream station, said conveyor comprising:
    at an upstream station, a belt for moving said products, and
    a movement device for moving a predetermined amount of products among said line of products, between said upstream station and a downstream station, the movement device having engaging elements able to be placed in contact with said products, said belt comprising a through opening, said movement device being arranged underneath said at least one passage, and said engaging elements being mounted to be movable relative to said movement device between a retracted position and an engaged position;

wherein said products are pucks, each suitable for receiving a product of a second kind, and wherein the pucks have seats for receiving the engaging elements.

15. The conveyor according to claim 14, wherein the seats each have an elongated shape to allow movement of the engaging elements.

16. An installation comprising at least two conveyors according to claim 15, each conveyor comprising a carriage as part of the respective movement device, wherein the two carriages have paths of different lengths between the upstream station and the downstream station such that the groups of products arrive at the downstream station in a staggered manner.

17. The conveyor according to claim 14, wherein the pucks comprise peripheral grooves near their base.

\* \* \* \* \*